United States Patent [19]

McGreevy

[11] Patent Number: 5,319,716
[45] Date of Patent: Jun. 7, 1994

[54] WIRELESS CD/AUTOMOBILE RADIO ADAPTER

[75] Inventor: William T. McGreevy, Babylon, N.Y.

[73] Assignee: Recoton Corporation, Long Island City, N.Y.

[21] Appl. No.: 32,444

[22] Filed: Mar. 16, 1993

Related U.S. Application Data

[63] Continuation of Ser. No. 760,915, Sep. 17, 1991, abandoned.

[51] Int. Cl.$^5$ .............................................. H04B 5/00
[52] U.S. Cl. ....................................... 381/79; 381/14; 455/6.3
[58] Field of Search .................... 381/77, 79, 14, 106, 381/86; 369/2, 6; 455/6.3

[56] References Cited

U.S. PATENT DOCUMENTS

| | | | |
|---|---|---|---|
| 3,934,201 | 1/1976 | Majefski | 381/14 |
| 4,495,643 | 1/1985 | Orban | 381/106 |
| 4,712,250 | 12/1987 | Michels et al. | 369/6 |
| 4,864,550 | 9/1989 | Kawanaka | 369/6 |

Primary Examiner—Forester W. Isen
Attorney, Agent, or Firm—Levisohn, Lerner & Berger

[57] ABSTRACT

This invention discloses a wireless compact disc stereo playback system for use in automobiles. An FM transmitter is employed which is connected at the output of a portable CD player, the FM transmitter thereby producing a stereo FM signal which is transmitted to be received by the automobile antenna. The automobile's FM system is tuned to play the output of the CD player through the FM radio system of the automobile. The output power of the FM transmitter and its bandwidth are selected so that the distance from the antenna to the FM transmitter will be sufficient to ensure effective sound production in standard automobiles and vans.

12 Claims, 1 Drawing Sheet

WIRELESS CD/AUTOMOBILE RADIO ADAPTER

This application is a continuation of application Ser. No. 07/760,915, filed Sep. 17, 1991, now abandoned.

BACKGROUND OF THE INVENTION

This invention relates to an automobile's sound system, and more particularly, to an adapter which allows a portable CD to be wirelessly connected through an FM radio in an automobile so that the CD plays through the FM radio.

The assignee of this application, Recoton Corporation, is the owner of U.S. Pat. No. 4,734,897. That patent is directed to a cassette adapter which is connected at the output of a portable CD player, with the cassette adapter inserted into the tape player allowing the CD to play through the tape player and tape system of the automobile. Hard wiring is required between the CD and cassette adapter. It is preferable, in certain instances, to eliminate hard wiring and electrical conductors to prevent possible damage to the system and otherwise provide a more convenient transmission system enabling a portable CD to play through an automobile stereo system.

An object of this invention is to provide a CD adapter which allows a portable CD to play through the stereo system of an automobile.

Another object of this invention is to provide such a wireless adapter system which complies with FCC regulations.

Another object of this invention is to provide such a system whose power is sufficient to enable transmission between a CD adapter and the antenna of the automobile with the FM radio of the automobile tuned to a frequency not being used in the area of use.

Yet another object of this invention is to provide such an adapter which is made of integrated circuitry, is of substantial conventional components, is inexpensive, compact and has minimum power drain.

Yet another object of this invention is to provide such an adapter system allowing the CD to be placed anywhere within the interior of the automobile without affecting the quality of transmission and play of the adapter system.

Other objects, advantages and features of this invention will become more apparent from the following description.

SUMMARY OF THE INVENTION

In accordance with the principles of this invention, the above objects are accomplished by providing a wireless FM transmitter connected at the output of the portable CD player, the wireless FM transmitter being tunable to an FM radio station so that when the radio is tuned to the desired station, it will play the output of the CD through its antenna which picks up the radio frequency output of the FM transmitter produced by the CD player. A standard Rohm integrated circuit is employed as the FM transmitter for stereo transmission, and this invention further comprises a compression circuit at the input of the FM transmitter as well as a DC balance circuit to balance the stereo output of the FM transmitter.

The bandwidth and power of the transmitter allows the device to operate under appropriate, FCC regulations, and the output power is set to be below 250 microvolts per meter at three meters with a bandwidth of 200 kilohertz. This will allow the antenna of the automobile radio to be up to ten feet away from the transmitter, with the antenna picking up the output of the transmitter to play the output signal through the antenna input into the FM radio of the automobile. In this manner, the wireless CD adapter can be used anywhere in the automobile so long as it is no more than ten feet from the antenna of the automobile. The FM transmitter transmits stereo sound through the antenna into the FM radio which then plays through the FM radio at a non-used FM signal in the local area.

BRIEF DESCRIPTION OF THE DRAWING

The figure submitted herewith is a schematic diagram of the wireless CD adapter stereo system.

DETAILED DESCRIPTION

Figure 1:
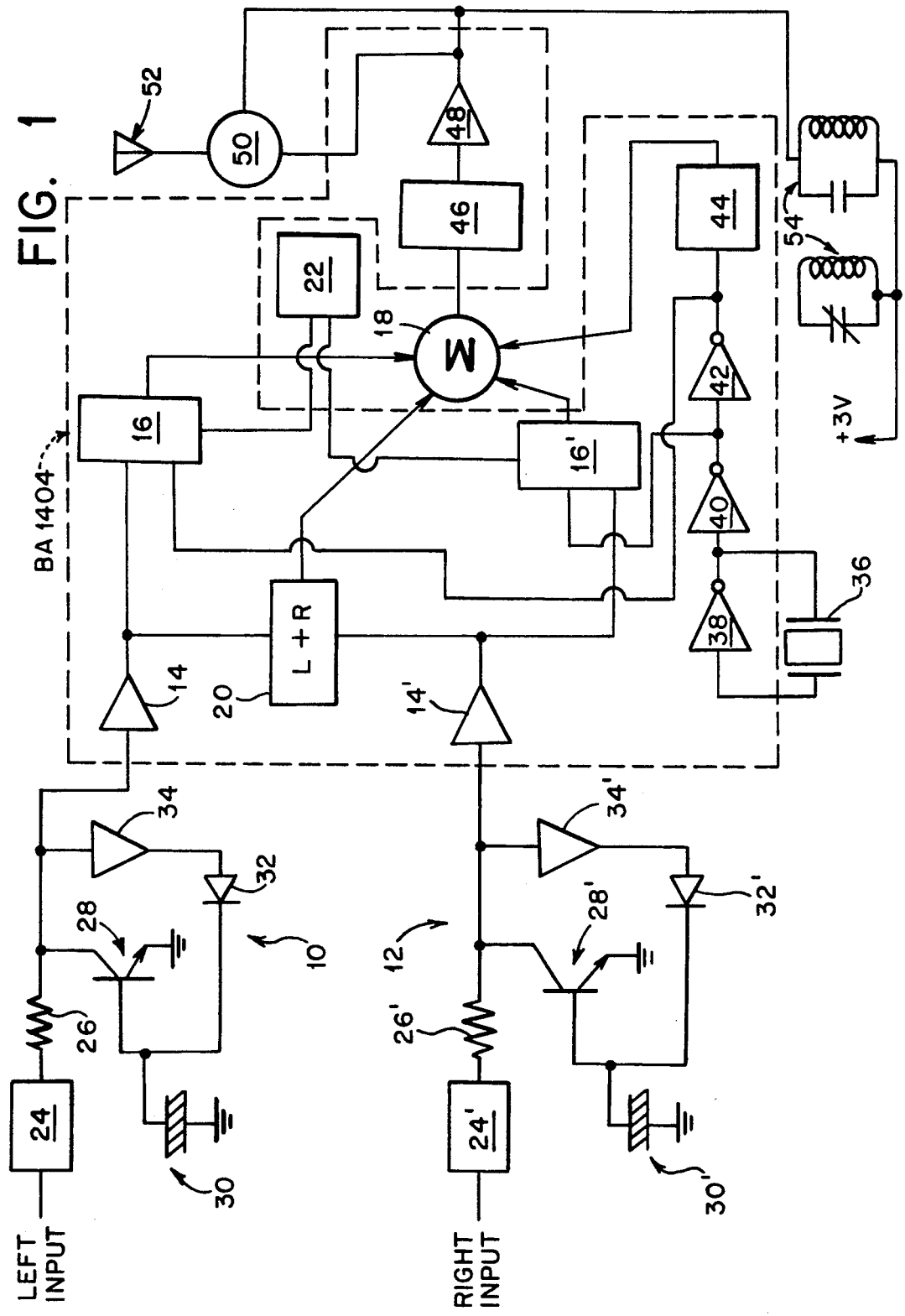

The figure of this invention illustrates an embodiment of this invention in which a standard Rohm BA 1404 integrated circuit is employed. That circuitry is illustrated within the dotted lines and comprises substantially standard FM transmitter circuitry. In particular, there is a left and a right channel 10 and 12, respectively, with the left channel including a pre-amp buffer 14, the output of which is applied to a balance modulator 16, the output of the balance modulator being supplied to a multiplexer circuit 18. The right channel 12 has the above-identified pre-amp buffer 14' and balance modulator 16' connected to the output of the pre-amp buffer 14' the output of the balance modulator 16' being supplied as an input to a composite mixer. A summation circuit 20 is connected between the outputs of the pre-amp buffers 14 and 14', and the output of summation circuit 20 is supplied to composite mixer 18. The outputs of the balance modulators 16 and 16' are supplied to a manually operated DC balance circuit 22 which adjusts the volume between the left and right channels of the FM system.

A compressor circuit generally shown by the numerals 10 and 12 is connected between the output of the CD and the input of the respective channels of the FM circuits. The compressor circuit comprises a pre-emphasis amplifier 24 which essentially operates at seventy-five microseconds and serves as a high frequency amplifier to improve the signal-to-noise characteristics of the circuit. The output of the pre-emphasis amplifier 24 is connected through a resistor 26 to the collector of an NPN transistor 28, the base of which is connected to a Zener diode 30 and to the collector through a diode 32 and series-connected amplifier 34.

The left and right sections of the FM transmitter are each provided with the above-identified compressor circuit which improves the signal-to-noise characteristics of the FM transmitter. The left section is described above, and the same description applies to the right circuit, the elements of which are designated with primed numerals.

A 19 KHz pilot signal, used for signaling receivers to enter stereo mode is provided from a 38 KHz quartz crystal 36 which regulates an oscillator composed of digital inverters 38, 40 and 42, the output of amplifier 40 also being supplied as one input to the balance modulator 16', while the output of amplifier 42 is supplied to balance modulator 16. A divider 44 is provided between the output of amplifier 42 and the composite mixer 18, the output of the composite mixer 18 being supplied as an input through a voltage controlled oscillator 46, the output of which is supplied through an RF amplifier 48 to an attenuator 50 and an internal antenna 52 of the transmitter. The VCO 46 is tuned in a standard fashion through a plurality of reactive components 54 manually controllable to adjust the transmission frequency of the FM transmitter in order to select a frequency band which is not used in the local area of the FM radio system.

In operation, the portable CD player is operated, and its outputs are supplied as inputs to the left and right sections of the compressor circuits indicated above. The automobile FM radio is turned on, and an FM band is selected, the FM band being one not utilized in the local area. The tuner of the transmitter of this invention is also set at the same frequency so that the antenna transmits at the pre-selected FM frequency, which frequency is detected by the antenna of an automobile to then allow the detected signal to play through the FM radio of the automobile.

The circuitry is designed to insure that the transmitter operates within the restrictions of the FCC in the frequency range of FM radio, and the RF transmission level does not exceed 250 microvolts with a bandwidth limited to 200 kilohertz. This RF level enables the transmitter inside a car to easily couple the stereo FM signal from the CD player into the car radio's antenna. The transmitter uses standard multiplex circuitry with the previously identified 19 kilohertz pilot signal so as to be compatible with any FM receiver, and at transmission frequencies selectable which can be set at a frequency that is not being used in the area of use.

It is anticipated that the transmitter is controlled to operate at a power range which enables the transmitter to be effective at distances of up to ten feet from the automobile's antenna. This allows the CD adapter to be used anywhere within an automobile or a van.

As stated above, a standard Rohm BA 1404 circuit is employed, and the FM transmitter can be an integrated circuit. This provides for low cost, compact size and a low power drain. The frequency response of the circuit may be excellent, stereo separation is easy to achieve, the signal-to-noise ratio is at a desirable level, and distortion is minimized. Desirable modulation levels can also be achieved with this invention.

The output band with the FM circuit is designed to maximize output power levels permitted under FCC regulations to provide a system which is conveniently designed to operate at a distance which would be most effective to couple the transmitter's output to the automobile's antenna input without detracting from overall sound performance. Choosing a distance of ten feet as that desired enables the desired output level to be achieved with the limited band within 200 kilohertz.

This invention has been described with respect to a CD player. In view of the rapidly changing sound production systems including DAT and the like, the wireless adapter is not limited for use with a CD player. In particular, it may be used with a DAT tape player, depending upon its configuration or with any other portable audio signal production device.

This invention has been described with respect to a preferred embodiment, and the scope of this invention is identified in the appended claims. It is anticipated that one of ordinary skill in the art will employ the principles of this invention and make modifications to the specific embodiments illustrated, and such modifications will not depart from the scope of the invention as protected by the claims appended hereto.

I claim:

1. In combination, a wireless compact disc player-/automobile radio adapter, an FM radio in an automobile and an antenna of said automobile connected to said FM radio, said adapter operating to couple radio frequency signals to said FM radio in said automobile through the antenna of the automobile, said adapter comprising
    a wireless radio frequency transmitter connected to receive as input signals the output of said compact disc player, said transmitter controlled to operate within the frequency range of an FM radio,
    said transmitter power operates below 250 microvolts per meter at three meters in the power range of unintentional power radiators, said transmitter to be used within said automobile and having sufficient power to generate a radio frequency signal which will be detected by the antenna of said automobile, said transmitter transmitting radio frequency signals which are detected by the antenna of the radio of the automobile,
    said adapter including said transmitter being portable and movable within said automobile without interruption of transmission of said radio frequency signals,
    said adapter operable to operate within said automobile when it is moving by coupling said radio frequency signal emanating from the transmitter to the antenna of the automobile,
    said transmitter being tunable by a passenger in the vehicle to a selected transmission frequency such that the FM radio of said automobile is tunable to said selected transmission frequency to enable the compact disc player to play through the antenna input to the FM radio of the automobile.

2. An adapter as set forth in claim 1, wherein said adapter comprises an integrated circuit.

3. An adapter as set forth in claim 1, wherein the transmitter operates with a predetermined bandwidth of 200 kilohertz.

4. An adapter as set forth in claim 3, wherein the transmitter is controlled to operate at a power range which enables effective transmission up to ten feet from the antenna.

5. An adapter as set forth in claim 1, further comprising a compression circuit located between the output of the compact disc player and the input of the transmitter.

6. An adapter as set forth in claim 1, wherein the transmitter transmits in stereo to the antenna of an automobile.

7. An adapter as set forth in claim 6, further comprising manual balance control to control the signal level of the components of the stereo signal.

8. An adapter as set forth in claim 1, further comprising a pilot tone for signaling the FM stereo receiver.

9. An adapter as set forth in claim 8, wherein the pilot signal is compatible with standard FM receivers.

10. An adapter as set forth in claim 9, wherein the pilot signal is set at nineteen kilohertz.

11. An adapter as set forth in claim 5, wherein said compression circuit comprises a high frequency amplifier to enhance signal-to-noise characteristics.

12. An adapter as set forth in claim 11, wherein said compression circuit further comprises a clipping circuit connected between said high frequency amplifier and the input of said transmitter to minimize saturation of the input section of said transmitter to limit the peak modulation levels of said transmitter.

* * * * *